Patented May 30, 1933

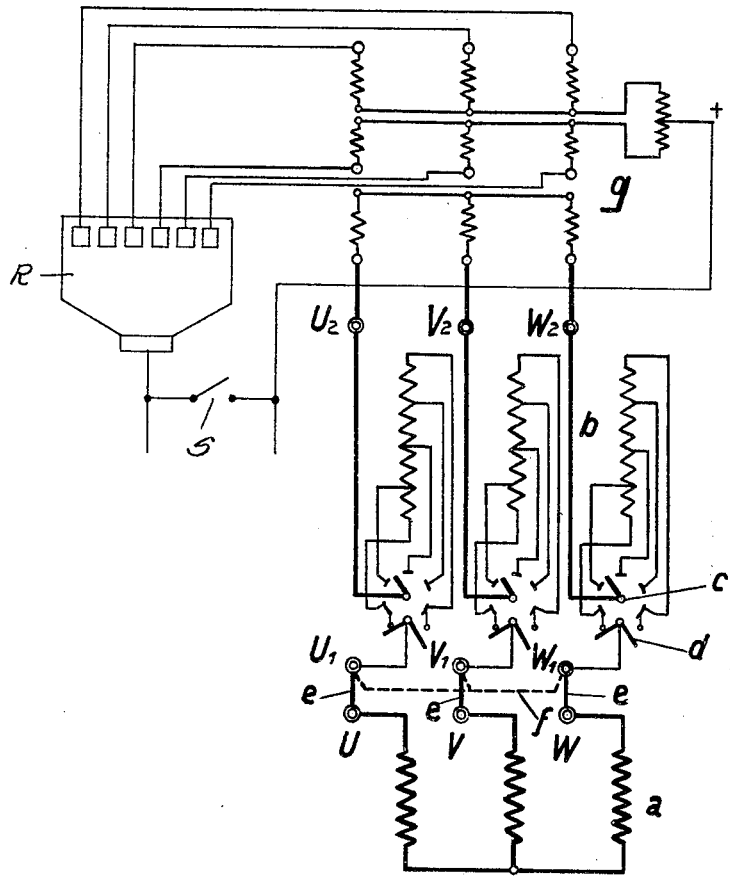

1,912,151

UNITED STATES PATENT OFFICE

ARMIN LEUTHOLD, OF BADEN, SWITZERLAND, ASSIGNOR TO AKTIENGESELLSCHAFT BROWN BOVERI & CIE, OF BADEN, SWITZERLAND, A JOINT STOCK COMPANY OF SWITZERLAND

METHOD OF PREPARING A MERCURY VAPOR RECTIFIER FOR ITS INITIAL NORMAL STATE OF OPERATION

Application filed February 5, 1932, Serial No. 591,048, and in Germany January 26, 1931.

In present day large rectifier installations, the transformers for feeding the rectifiers are mostly combined with a regulating transformer, so that it is possible to regulate the continuous current voltage within certain limits. The regulating transformer consists in such cases of a fixed main winding and a regular step winding which can be connected to and disconnected from the main winding.

Before a mercury vapor rectifier, after being completely assembled, is put into operation for the first time, it is necessary to remove the gas from the anodes. When the removal of the gas is effected at the place where the rectifier is mounted with the normal working voltage of the latter, there is the disadvantage that owing to the great amount of gas given off by the anodes, the reliability of working of the rectifier is at first endangered, so that back-arcing may occur and the anodes destroyed on account of such action. This treatment at the normal voltage of the rectifier has a further disadvantage, which resides in the fact that it is difficult to obtain the requisite loading resistances required for completely removing the gas from the anodes until the rectifier is under the corresponding full load. Furthermore, through such a removal of the gas from the rectifier at normal voltage, considerable loss of power is entailed.

According to my invention, all these disadvantages are overcome by using as the feeding voltage for the rectifier transformer only the voltage induced in the regulating winding associated with the fixed main winding of the regulating transformer, which voltage is regulated as required by a step switch from zero up to the maximum value. By regulating this induced voltage in steps, it is possible to regulate the continuous current voltage of the rectifier from zero up to a certain fraction of the normal voltage, so that it is possible to effect the removal of the gas without loading resistances, the rectifier being short-circuited on the continuous current side.

My invention resides in the improved method of operation of the character hereinafter described and claimed.

In the accompanying drawing the figure is a diagrammatic showing of a current-rectifying system operable in accordance with my invention. In the drawing $a$ is the fixed winding and $b$ the regulating winding, provided with tappings, of a regulating transformer which is, for instance, an auto-transformer and in which the regulating winding can be connected by a change-over switch $d$, combined with a step switch $c$, so as to act in the same sense as or in opposite sense to the fixed winding. The network terminals of the regulating transformer are designated by the reference characters U, V and W. In the normal working arrangement connecting conductors $e$ lead from these terminals to the terminals $U_1$, $V_1$, $W_1$ of the regulating winding. The output terminals $U_2$, $V_2$, $W_2$ of the regulating transformer provide the supply of variable voltage to the primary winding $g$ of the rectifier feeding transformer, the secondary winding of which feeds the anodes of a rectifier R in the usual manner. The terminals $U_1$, $V_1$, $W_1$ are mounted, as are also all the other transformer terminals, on the cover of the transformer casing, so that the connections $e$ between the main winding of the regulating transformer and the regulating winding of the change-over switch $d$, are established outside the casing.

In the normal working state, the regulating winding $b$ can be connected, so as to act in the same sense as or in the opposite sense to the fixed main winding $a$ in a known manner by the change-over switch $d$, the voltage output being regulated by the step switch $c$. At the terminals $U_2$, $V_2$, $W_2$, therefore, the voltage of the main winding, increased or diminished by the voltage of the regulating winding, is available for feeding the rectifier transformer.

When this transformer arrangement, in accordance with my invention, is to be used for removing the gas from the anodes of a rectifier without loading resistance at the place where the latter is to be used, the conductor connections $e$ are opened and the conductor connection $f$ is utilized, as shown by dash lines, whereby the regulating windings $b$ are brought together to a star point. The main winding $a$ of the regulating transformer is thereby separated from the regulating winding, and at the terminals $U_2$, $V_2$, $W_2$ there is only available for feeding the rectifier transformer the voltage induced in the regulating winding, which can itself be regulated by means of the step switch $c$ from zero up to the maximum value.

The arrangement or method of operation according to my invention, owing to the regulation of the continuous current voltage down to zero, enables the rectifier to be short-circuited on the continuous current side by a suitable switch device S, so that without special loading resistances the removal of gas from the anodes can be effected with quite small losses up to the normal load of the rectifier. A great advantage of my invention resides in the fact that, owing to the relatively small voltages, which can be regulated from zero up to the maximum value, even when the anodes give off the greatest amount of gas, no back-arcing can occur in the rectifier. Consequently, the rectifier can be made ready for working at the place where it is to be used in a simple and cheap manner without the employment of loading resistances, as has been found to be necessary heretofore. The regulating transformer and the rectifier transformer can be mounted either in separate oil vessels or in a common vessel.

I claim as my invention:

1. In the art of current rectification wherein the anodes of a mercury vapor rectifier are supplied by a feeding transformer, wherein said transformer is supplied through a regulating transformer, and wherein the regulating transformer comprises a main winding and an associated voltage-regulating winding; the method of preparing the rectifier for its initial, normal state of operation, which comprises substantially short-circuiting the direct-current side of the rectifier, supplying said feeding transformer only with the voltage induced in said regulating winding, and regulating the voltage output from said regulating winding to said feeding transformer to effect the required preparation.

2. In the art of current rectification wherein the anodes of a mercury vapor rectifier are supplied by a feeding transformer, wherein said transformer is supplied through a regulating transformer, and wherein the regulating transformer comprises a main winding and an associated voltage-regulating winding; the method of preparing the rectifier for its initial, normal state of operation, which comprises substantially short-circuiting the direct-current side of the rectifier, disconnecting said main winding from said regulating winding, connecting said regulating winding in star, supplying said feeding transformer only with the voltage induced in said regulating winding, and regulating the voltage output from said regulating winding to said feeding transformer to effect the required preparation.

In testimony whereof I have hereunto subscribed my name this twenty-two day of January A. D. 1932.

ARMIN LEUTHOLD.